INVENTOR
R. R. BLAIR
BY
V. P. Priolo
ATTORNEY

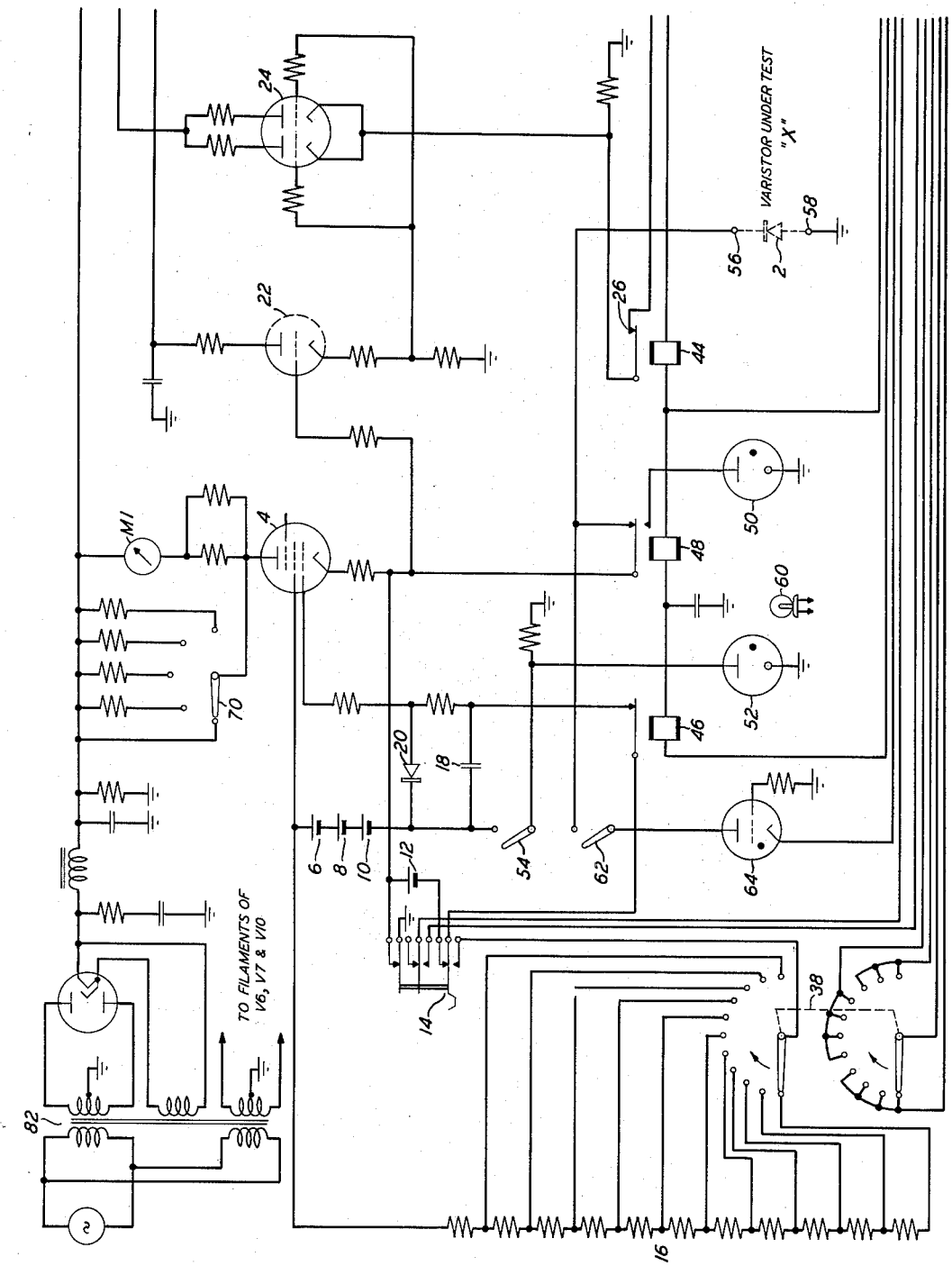

United States Patent Office 2,749,517
Patented June 5, 1956

2,749,517

APPARATUS FOR TESTING NONLINEAR RESISTORS

Royer R. Blair, Berkeley Heights, N. J., assignor to Bell Telephone Laboratories, Incorporated, New York, N. Y., a corporation of New York Application November 5, 1954, Serial No. 466,997

5 Claims. (Cl. 324—158)

This invention relates to apparatus for measuring the inverse peak voltage of a nonlinear resistor and particularly, the inverse peak voltage of a resistor exhibiting negative resistance beyond its peak.

In accordance with the present invention an increasing inverse voltage is developed across the resistor under test. A condenser connected in series with an asymmetrically conductive device is charged to a value corresponding to the inverse peak voltage developed across the resistor. When the resistor goes over its peak and passes into its negative resistance region the voltage across it decreases. This decrease in voltage produces a change in potential at the junction of the condenser and the asymmetrically conductive device. Means responsive to the change in potential disconnects the condenser from the charging circuit and traps the charge therein for measurement by a meter.

Figure 3:
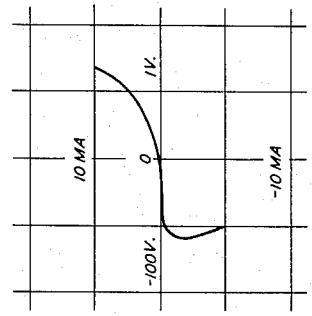
Figure 2:
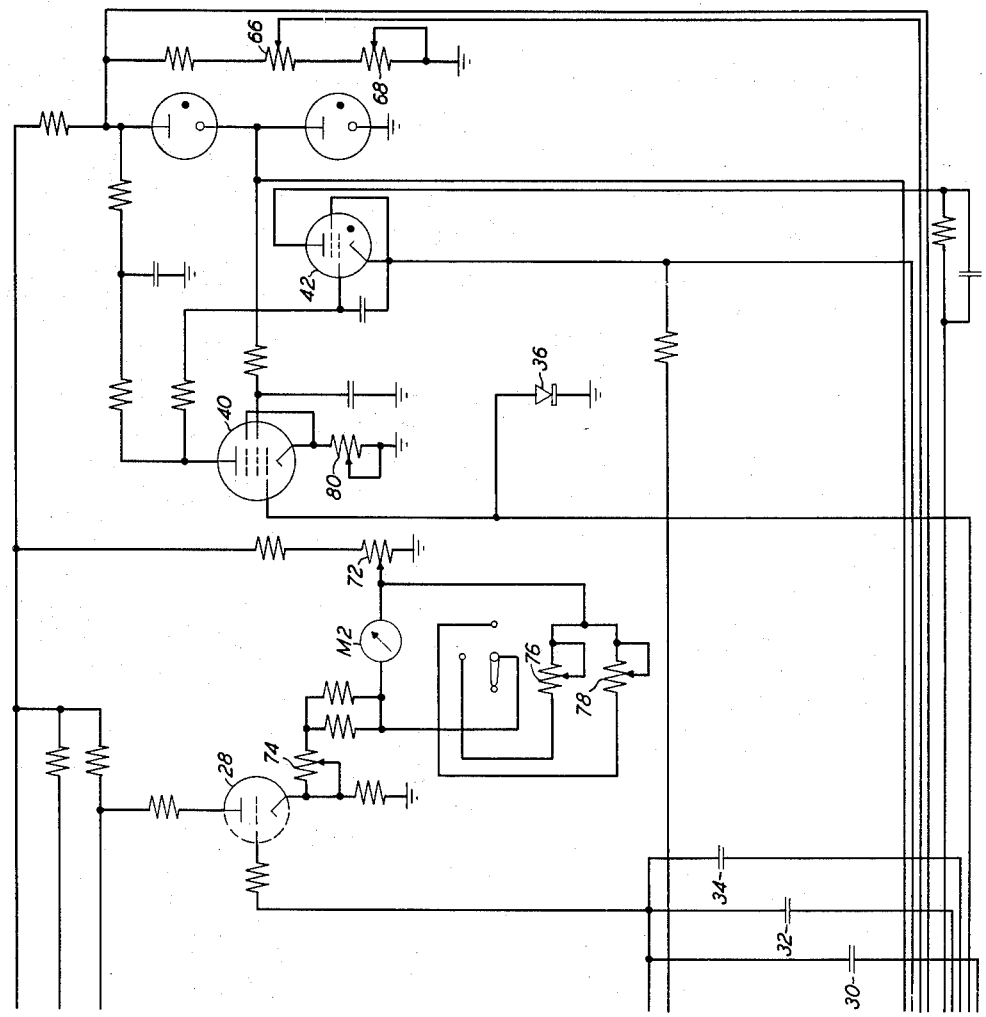

A feature of the invention resides in the arrangement provided for trapping, in the condenser, the charge which corresponds to the developed inverse peak voltage. This and other features of the invention will be more clearly understood from the following detailed description and the accompanying drawings in which:

Figs. 1 and 2 show a complete circuit diagram of a preferred embodiment of the invention; and Fig. 3 is a characteristic curve for a resistor which exhibits negative resistance beyond its inverse peak voltage.

Referring now to Figs. 1 and 2 resistor 2, which is the resistor to be tested, is connected in series with a pentode 4 having a floating and constant screen voltage supply comprising batteries 6, 8 and 10. Pentode 4 is initially biased at cut-off by means of battery 12. On depressing key 14 current from the screen supply is allowed to flow through one or more of resistors 16 into condenser 18 which is in the grid circuit of pentode 4. This causes the grid to become less and less negative and the plate current to steadily increase. The function of diode 20 is to limit the rise in grid potential. The voltage across resistor 2 increases until it reaches a peak value. The resistor then develops negative resistance and as the current continues to increase the voltage thereacross decreases. Fig. 3 shows a typical forward characteristic in the first quadrant and a typical reverse characteristic in the third quadrant for a resistor of the type to be tested, a point-contact germanium diode. The reverse curve is distinctive in that it reaches a peak voltage and then doubles back under itself in a negative resistance region.

In the embodiment of the invention shown in Figs. 1 and 2 the voltage across resistor 2 is fed to a cathode follower 22 and a portion of the output of cathode follower 22 is applied to the input of cathode follower 24. The voltage across resistor 2 may, however, be applied directly to the input of cathode follower 24. The output from the cathode of tube 24 goes through contact 26 of relay 44 to charge condenser 30, 32 or 34 through the asymmetrically conductive device 36.

Condensers 30, 32 and 34 are in the grid circuit of cathode follower 28 whose purpose is to serve as a very high impedance voltmeter with meter M2 in its cathode circuit to read the voltage across the condensers.

The rate at which the current through resistor 2 is allowed to rise is controlled by the choice of resistors 16 and is set by adjusting switch 38. For the slower rates of attack condenser 30 is used to store and hold the charge which is to indicate the inverse peak voltage. Condensers 32 and 34 are used for medium and high rates of attack respectively. Asymmetrically conductive device 36 provides a charging path for the condensers and also a high resistance across which a negative signal can be developed when the voltage across resistor 2 decreases.

When resistor 2 goes over its peak and the voltage across it decreases the negative signal developed across device 36 is applied to the grid of amplifier 40. The plate potential of amplifier 40 rises and results in the firing of thyratron 42 which in turn operates relays 44, 46 and 48. Relay 44 operates quickly to disconnect condenser 30, 32 or 34 from the cathode of tube 24. The trapped charge on condenser 30, 32 or 34 leaks off very slowly and allows meter M2 time enough to read the peak voltage through tube 28. Relay 46 disconnects condenser 18 from the screen supply so that voltage on this condenser will not continue to rise after the peak voltage across resistor 2 is reached. This halts the rise in plate current in pentode 4 and allows meter M1 to read the current required to take resistor 2 over its peak. Relay 48 transfers the plate current of pentode 4 from resistor 2 to the voltage regulator tube 50. The reason for transferring the output of tube 4 to tube 50 is that tube 4 is not a perfect constant current generator. If the cathode of tube 4 were grounded instead of being connected to tube 50 at plus 150 volts after the peak voltage has been measured the current read on meter M1 would be too high. The amount of power dissipated in tube 4 is also reduced by this procedure. If the 150-volt drop across tube 50 is not near enough to the range of peak voltages being measured and if the current read on meter M1 is of interest other choices of tube 50 would be a VR75 or a VR105 tube for voltages of 75 and 105 volts, respectively.

With tube 52 connected to pentode 4 by switch 54 and with no resistor under test across binding posts 56 and 58 the performance of the test set may be checked. Tube 52 should have a very consistent firing voltage. Light 60 helps the gas in tube 52 to ionize and to improve the tube as a peak standard.

On closing switch 62 tube 64 is placed in parallel with resistor 2. With this arrangement it is possible to build up the reverse voltage across resistor 2 quickly, shut it off quickly to avoid heating the resistor and still read the current flowing through the resistor. By varying the setting of resistor 66 (resistor 68 merely adjusts the voltage range available on resistor 66) the voltage at which tube 64 will fire and stop the rise in voltage across resistor 2 may be varied upwards from about 25 volts.

Meter M1 has shunts across it to give it ranges of 1, 10, 20 or 50 milliamperes. If the current is of no interest, switch 70 should be left in the position shown.

The zero on meter M2 is adjusted by means of resistor 72. Resistors 74, 76 and 78, respectively, control the accuracy of the 120, 300 and 600-volt ranges.

Resistor 80 ultimately controls the bias on thyratron 42 and should be set as close to the firing point as possible without having the tube trip on switching transients.

The necessary anode potentials and heater voltages are provided by the conventional power supply 82.

It is to be understood that the above-described arrangements are illustrative of the application of the principles of the invention. Other arrangements may be devised by those skilled in the art without departing from the spirit and scope of the invention.

What is claimed is:

1. Apparatus for measuring the inverse peak voltage of a nonlinear resistor which comprises a current generator serially connected to said resistor, means for controlling said generator to produce a steadily increasing output therefrom, an amplifier including input and output terminals, a condenser serially connected to an asymmetrically conductive device, a recording device, means for applying the steadily increasing inverse voltage developed across said resistor to the input terminals of said amplifier, means for connecting the output terminals of said amplifier to said condenser to charge said condenser through said asymmetrically conductive device to a value corresponding to the inverse voltage developed across said resistor, means responsive to the change in potential at the junction of said condenser and said asymmetrically conductive device, when the inverse voltage developed across said resistor decreases from its peak value, for disconnecting said condenser from said amplifier and said resistor from said generator, means comprising said recording device connected to said condenser for measuring the charge thereon.

2. Apparatus for measuring the inverse peak voltage of a nonlinear resistor which comprises a current generator serially connected to said resistor, means for controlling said generator to produce a steadily increasing output therefrom, an amplifier having an input and an output, a condenser serially connected to an asymmetrically conductive device, a relay, a thyratron, said relay being adapted to be energized by said thyratron, means for applying the steadily increasing inverse voltage developed across said resistor to the input of said amplifier, means for connecting the output of said amplifier through a closed contact of said relay to said condenser to charge said condenser through said asymmetrically conductive device to a value corresponding to the inverse voltage developed across said resistor, means responsive to the change in potential at the junction of said condenser and said asymmetrically conductive device, when the inverse voltage developed across said resistor decreases from its peak value, for firing said thyratron and energizing said relay to open said contact, a recording device, means comprising said recording device connected to said condenser for measuring the charge thereon.

3. Apparatus for measuring the inverse peak voltage of a nonlinear resistor which comprises a current generator serially connected to said resistor, means for controlling said generator to produce a seadily increasing output therefrom, a first cathode follower, a second cathode follower, a condenser, an asymmetrically conductive device, a recorder, one terminal of said condenser being connected to the cathode of said first cathode follower and to the grid of said second cathode follower, the other terminal of said condenser being connected to ground through said asymmetrically conductive device, means for applying the steadily increasing inverse voltage developed across said resistor to the grid of said first cathode follower thereby charging said condenser to a value corresponding to said developed inverse voltage, means responsive to the change in potential at the junction of said condenser and said asymmetrically conductive device, when the inverse voltage developed across said resistor decreases from its peak value, for disconnecting said condenser from said first cathode follower and said resistor from said generator, means comprising said recorder connected in the cathode circuit of said second cathode follower for measuring the charge on said condenser.

4. Apparatus for measuring the inverse peak voltage of a nonlinear resistor which comprises a current generator serially connected to said resistor, means for controlling said generator to produce a steadily increasing output therefrom, a first cathode follower, a second cathode follower, a condenser, an asymmetrically conductive device, a relay, a thyratron, said relay being adapted to be energized by said thyratron, one terminal of said condenser being connected through a closed contact of said relay to the cathode of said first cathode follower and directly to the grid of said second cathode follower, the other terminal of said condenser being connected to ground through said asymmetrically conductive device, means for applying the steadily increasing inverse voltage developed across said resistor to the grid of said first cathode follower thereby charging said condenser to a value corresponding to said developed inverse voltage, means responsive to the change in potential at the junction of said condenser and said asymmetrically conductive device, when the inverse voltage developed across said resistor decreases from its peak value, for firing said thyratron and energizing said relay to open said contact, a recorder, means comprising said recorder connected in the cathode circuit of said second cathode follower for measuring the charge on said condenser.

5. Apparatus in accordance with claim 4 wherein said current generator and the controlling means therefor comprise a space discharge device initially biased at cut-off and including an anode, a screen grid, a control grid and a cathode, a source of positive potential connected to said anode, a voltage supply adapted to provide a substantially constant potential to said screen grid, a condenser in the control grid circuit of said tube, and means for causing current from said screen grid supply to flow through said condenser to steadily decrease the negative potential on said control grid.

No references cited.